United States Patent [19]

Vaughn et al.

[11] Patent Number: 4,742,480
[45] Date of Patent: May 3, 1988

[54] CYCLE COUNTER/SHIFTER FOR DIVISION

[75] Inventors: Herchel A. Vaughn; Kuppuswamy Raghunathan; Philip S. Smith, all of Austin, Tex.

[73] Assignee: Motorola, Inc., Schaumburg, Ill.

[21] Appl. No.: 741,914

[22] Filed: Jun. 6, 1985

[51] Int. Cl.⁴ .............................. G06F 7/52; G06F 7/38
[52] U.S. Cl. .................................. 364/764; 364/749
[58] Field of Search ............... 364/759, 200 MS File, 364/900 MS File, 761, 764, 766, 749

[56] References Cited

U.S. PATENT DOCUMENTS

| | | | |
|---|---|---|---|
| 4,228,518 | 10/1980 | Chamberlin | 364/759 |
| 4,326,247 | 4/1982 | Chamberlin | 364/200 |
| 4,413,326 | 11/1983 | Wilson et al. | 364/748 |
| 4,418,383 | 11/1983 | Doyle et al. | 364/200 |
| 4,564,920 | 1/1986 | Briggs | 364/757 |

Primary Examiner—Gareth D. Shaw
Assistant Examiner—Rebecca L. Adams
Attorney, Agent, or Firm—John A. Fisher; Jeffrey Van Myers; David L. Mossman

[57] ABSTRACT

A data processor for performing a division operation requiring shifting and the counting of the number of shifts, having no dedicated counters therefor. An additional shift left path from the temporary register of the previous bit to the next bit address bus is the only extra circuitry added, which greatly simplifies the shift left circuit of the temporary register. In addition, the dedicated counter may be eliminated as a formerly idle address incrementer circuit now performs the shift left and count functions. Not only are formerly idle registers now being used for lengthy shifting and cycle counting operations, but an overall savings in chip area is recognized, since the dedicated counter is eliminated and the dedicated shifter is greatly simplified.

6 Claims, 2 Drawing Sheets

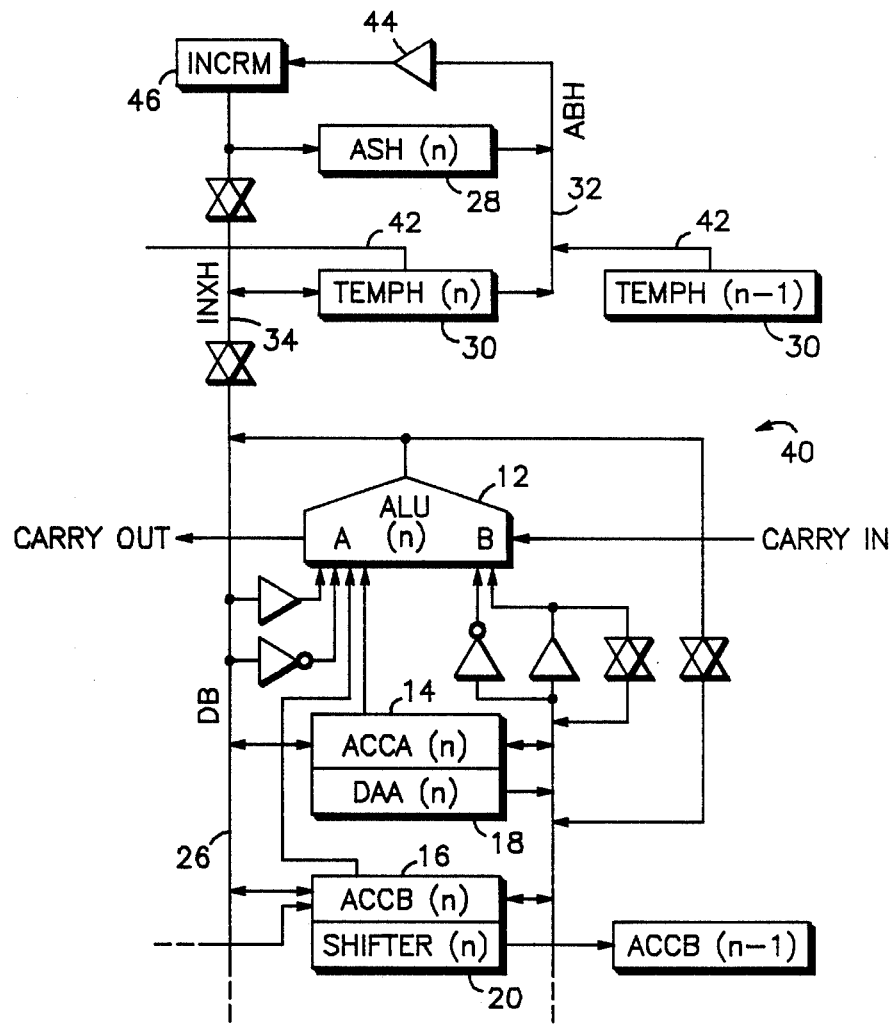
FIG. 2
FIG. 3
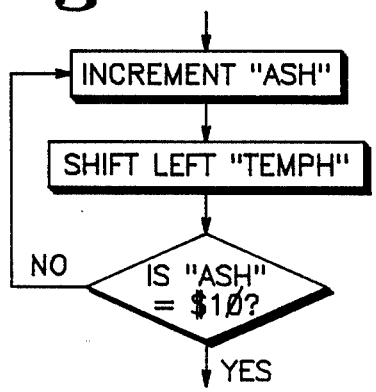

CYCLE COUNTER/SHIFTER FOR DIVISION

FIELD OF THE INVENTION

The present invention relates generally to instructions and circuits for data processors and, more particularly, to instructions and circuits for a data processor which involve shifting and cycle counting functions during the divide operation.

BACKGROUND OF THE INVENTION

In typical data processors, the performance of the divide operation involves, at some point, shifting the data blocks or bit groups left and counting the number of shifts. For most operations, the number of shifts required are on the order of two or three and do not comprise an appreciable portion of the overall operation. However, in some operations, such as division, the number of shifts required are numerous, requiring shifting left through the entire bit string. For example, in a division operation with a sixteen bit (two byte) wide quotient, the quotient must be shifted left sixteen times during a subtract suboperation in the arithmetic logic unit (ALU) of the data processor central processing unit (CPU). This shift sequence must be counted so that the CPU will know when to jump out of the loop or sequence of iterations.

The functions of shifting and counting are ordinarily handled by a dedicated shifter and a dedicated counter which come into play only during the divide operation. No known data processor performs the shift and count functions for loops in the neighborhood of sixteen iterations without a dedicated shifter and a dedicated counter.

SUMMARY OF THE INVENTION

Accordingly, it is an object of the present invention to provide a method and circuit for shifting left data blocks or bit strings and counting the number of iterations through the loop without employing a dedicated counter and a dedicated shifter and thus saving silicon area.

Another object of the present invention is to provide a method and circuit for shifting left data blocks or bit groups and counting the number of shifting iterations using registers ordinarily idle during the divide operation.

Still another object of the present invention is to provide a method and circuit for cycle counting and shifting functions during the divide operation which require a minimum amount of new circuitry.

In carrying out these and other objects of the invention, there is provided, in one form, a data processor having a plurality of input/output (I/O) ports, a random access memory (RAM), a read only memory (ROM) and a central processing unit (CPU). The CPU in turn has an address incrementer circuit, the high byte of which is ordinarily idle during arithmetic operations involving many iterations. Further, the address incrementer circuit has two registers, an address store high (ASH) register and a temporary high (TEMPH) register. It has been discovered that if only a shift left path from the TEMPH register to the address bus of the next bit is added, the dedicated cycle counter and the dedicated shifter can be eliminated, for the TEMPH register can now perform the shift function, each shift being counted by the ASH register.

BRIEF DESCRIPTION OF THE DRAWINGS

FIG. 2 is a partial block diagram of some of the registers in a bit slice out of the execution unit of the CPU of the present invention; and FIG. 3 is a flow diagram illustrating the execution of the shift and count functions in a loop to be performed during the divide operation requiring many iterations.

DETAILED DESCRIPTION OF THE INVENTION

Figure 1:
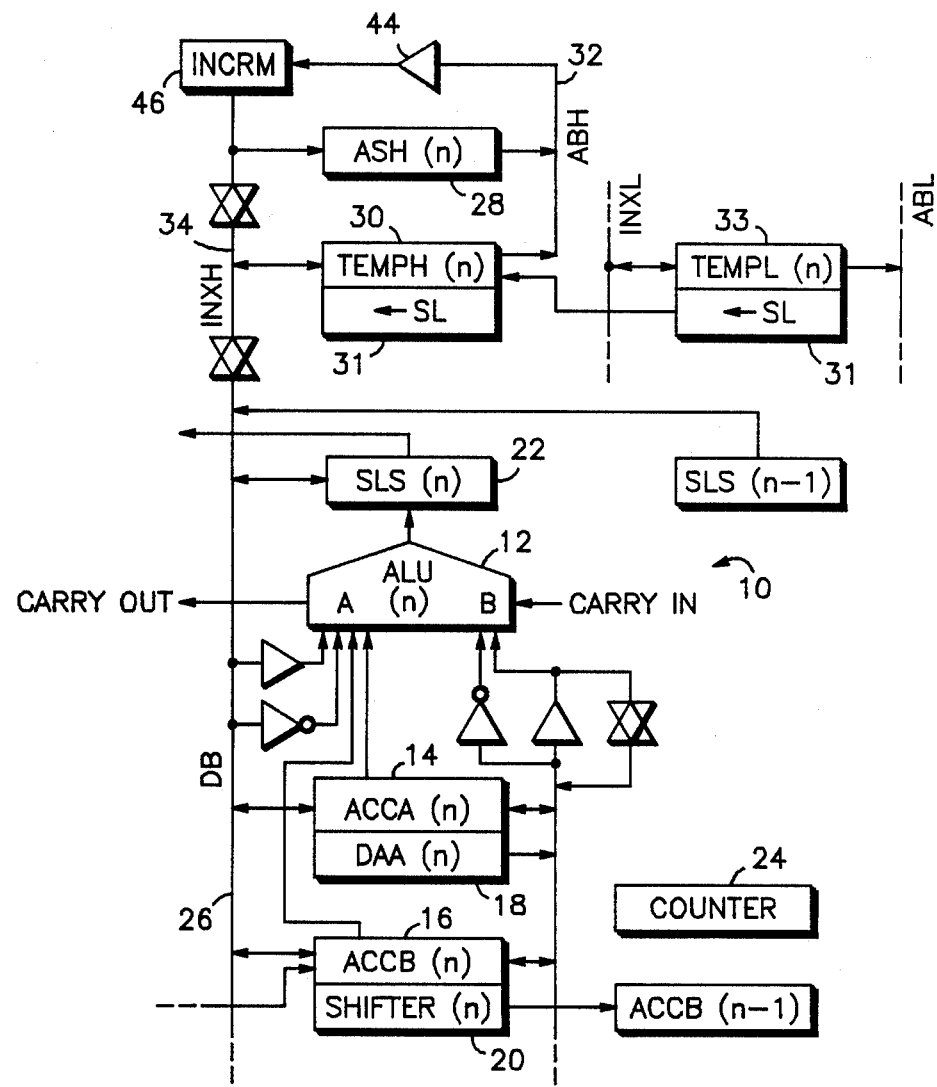
FIG. 1 is a partial block diagram of some of the registers in a bit slice out of the execution unit of a prior art data processor CPU.

Shown in FIG. 1 is a block diagram of some of the registers in a bit slice out of the execution unit of a prior art CPU 10, including an arithmetic logic unit (ALU) 12, an A accumulator (ACCA) 14, a B accumulator (ACCB) 16 as well as a decimal adjust accumulator (DAA) 18 and an accumulator contents shifter 20. These registers, accumulators and shifters aid the ALU 12 in the performance of its various operations and they are not changed by the present invention.

It should be noted that two B accumulators designated ACCB (n) and ACCB (n−1) are shown. The (n) notation merely refers to the bit slice of the circuit being discussed while (n−1) refers to the previous bit. Thus, (n+1) notation would refer to the next bit slice of the execution unit. In a sixteen bit (two byte) circuit there would be sixteen of these bit slices forming all of the execution unit and attendant circuits.

The output from ALU 12 in the prior art circuit of FIG. 1 goes to shift left sum register (SLS) 22, for the divide operation. Every pass through shift left sum register 22 is counted by dedicated counter 24 before the next iteration in the divide loop, for example, and the shifted ALU output goes to data bus (DB) 26. Dedicated counter 24 may not actually be located in CPU 10, but may be located elsewhere in the data processor such as in the clock circuits. In the normal course of arithmetic operations, address store register high (ASH) 28, as well as two other registers not shown, connected between address bus high (ABH) 32 and increment index line high (INXH) 34 are idle. Central processing unit 10 also contains temporary register high (TEMPH) 30 which has associated therewith dedicated shifter (SL for shift left) 31. Although TEMPH register 30 and SL shifter 31 function as shifters during the divide operation, it can be appreciated from FIG. 1 that the circuitry is rather complex. Dedicated SL shifter 31 obtains its values from the SL shifter 31 associated with temporary register low (TEMPL) 33. Also seen in FIG. 1 are address latch circuit 44 and address incrementer circuit 46, which are also ordinarily idle during the divide operation.

Shown in FIG. 2 is part of the CPU 40 circuit for the data processor of this invention showing a bit slice out of the execution unit analogous to that of the prior art CPU 10. It will be noted that an extra shift left path 42 has been added to permit the n TEMPH register 30 to be interconnected to the next bit address bus 32. Note that the (n−1) TEMPH register 30 has a shift left path 42 to the (n) address bus 32. With this line addition, dedicated shifter SL 31 may be greatly simplified, or perhaps even eliminated, as its function may now be performed by the TEMPH register 30 and address incrementer circuit 46. It should be noted that address incrementer circuit 46 does not perform the increment function during the shift operation, but it drives the shifted number into TEMPH register 30. With the implementation of incrementer circuit 46, ASH register 28 is incremented for each shift. The dedicated counter 24 may also be eliminated as its function is now performed by ASH register 28. In addition, shift left sum register SLS 22 has been eliminated as its function is now done by the input to ALU 12, although this change is not part of the invention herein. The other elements of the CPU 40 circuit remain the same as in the prior art structure.

Shown in FIG. 3 is a flow diagram which will help to explain the operation of the inventive circuit. During a division operation requiring numerous shifts that must be counted, the cycle count is stored in ASH register 28 while the quotient bits are shifted into register TEMPH 30. Additional shift left path 42 is needed to aid in the shifting function. These registers are updated in a two-cycle loop as shown in FIG. 3. Meanwhile, the dividend or numerator, which is stored in TEMPH register 30 is shifted out of the most significant bit end to the ALU 12 via another pathway not shown.

The increment of the "counter register", performed by ASH register 28 and the shift left operations, performed by TEMPH register 30 may be performed on alternate cycles if the registers are wider than the ALU 12. For example, if the registers are two bytes wide and the ALU 12 can only handle one byte strings, then the shift and increment functions have to be performed every two or every other cycle. If the ALU 12 and the registers can handle bit strings of equal length, then the shifting and counting functions may be performed every cycle. Of course, the clocking scheme may have to be reworked.

Because the ASH register 28 is automatically initialized to $00 (the $ indicating hexadecimal notation), the CPU 40 need only monitor one counter bit (the fifth bit) to jump out of the loop after sixteen iterations, when the count equals $10. Of course, if the bit string is of a different length, it must be shifted through its entire length, whatever that happens to be. The ASH register 28 only needs to be eight bits wide to count for a two byte quotient. If the quotient is of a different length, the size of ASH register 28 may have to be different, of course.

Again, to reemphasize, the structural differences between the present invention and the prior art are the addition of a new shift path 42 and the elimination of a dedicated counter 24 and the simplification of dedicated shifter SL 31. It should also be noted that now address incrementer circuit 46 now performs the shift left and count store functions of the divide operation. This tradeoff results in a net savings of silicon chip area.

We claim:

1. In a data processor comprising a central processing unit wherein the central processing unit comprises an address incrementer comprising a plurality of adjacent bit slices, each of said bit slices comprising an address store register and a temporary register, both the address store register and the temporary register connected to an address bus and a data bus, where said address store register and said temporary register are both normally idle during a division operation, the improvement comprising a shift left path from an output of the temporary register of a bit to the address bus of an adjacent bit to permit a number to be shifted to the temporary register of the adjacent bit, which is one shift left cycle, and means for permitting the address store register to count shift left cycles in the temporary register during a divide operation, thereby permitting the absence of a dedicated counter normally used to count shift left cycles during a divide operation.

2. In a data processor comprising a central processing unit wherein the central processing unit comprises an arithmetic logic unit, an address bus, a data bus, and a plurality of n adjacent bit slices, each of said bit slices comprising an address store register and a temporary register, where both said address store register and said temporary register are connected to the address bus and the data bus, and both said address store register and said temporary register are normally idle during a division operation wherein the improvement comprises a shift left path from an output of the temporary register of a $n-1$ bit to the address bus of a n bit to permit a number to be shifted to the temporary register of the adjacent bit, which is one shift left cycle, and means for permitting the address store register to count shift left cycles in said temporary register during a divide operation, thereby permitting the absence of a dedicated cycle counter normally used to count shift left cycles during a divide operation.

3. In a data processor comprising a central processing unit wherein the central processing unit comprises an arithmetic logic unit, an address bus, a data bus, and a plurality of adjacent bit slices, each of said bit slices comprising an address store register and a temporary register, and where both said address store register and said temporary register are connected to said address bus and said data bus, and where said address store register and said temporary register are both normally idle during a divide operation, wherein the improvement comprises a shift left path from an output of the temporary register of a bit to the address bus of an adjacent bit to permit a number to be shifted to the temporary register of the adjacent bit, which is one shift left cycle, and means for permitting the address store register to count shift left cycles in the temporary register during a divide operation, thereby permitting the absence of a dedicated cycle counter and a dedicated shifter normally used to count shift left cycles and perform shift left cycles during a divide operation, respectively.

4. A method for performing a divide operation in a data processor comprising a central processing unit wherein the central processing unit comprises an arithmetic logic unit, an address bus, a data bus and a plurality of adjacent bit slices, each of said bit slices comprising an address store register and a temporary register, where said address store register and said temporary register are both connected to the address bus and the data bus, and said address store register and said temporary register are both normally idle during a division operation, wherein the improvement comprises a step of using the address store register for counting repetitive shift cycles performed in the temporary register, by means of the address bus and the data bus, and a step of using the temporary register in each bit for shifting left a dividend or numerator bit string provided by the arithmetic logic unit over a shift left path from an output of the temporary register of a bit to the address bus of an adjacent bit during a division operation, which is one shift left cycle, in the absence of a step of using a dedicated counter to count shift left cycles during a divide operation by means of signals provided on the data bus, and in the absence of a step of using a dedicated shifter to perform the shift left cycles during a divide operation.

5. The method of claim 4 further comprising the step of the data processor monitoring the number of shift left cycles counted by the address store register, which, in turn, includes the steps of counting the shift left cycles performed by the temporary register, and causing the data processor to jump out of a cycle loop of shifting and counting after a predetermined number of cycles are performed.

6. In a data processor comprising a central processing unit wherein the central processing unit comprises an address incrementer circuit having a plurality of adjacent bit slices, each of said bit slices comprising an address store register and a temporary register, both the address store register and the temporary register connected to an address bus and a data bus, and both said address store register and said temporary register are normally idle during a divide operation, the improvement comprising a shift left path from an output of the temporary register of a bit to the address bus of an adjacent bit to permit a number to be shifted to the temporary register of the adjacent bit, which is one shift left cycle, and means employing the address bus and the data bus to work in conjunction with and for permitting the address store register to count shift left cycles performed by the temporary register using the shift left path during a divide operation, thereby permitting the absence of a dedicated counter normally used to count shift cycles during a divide operation.

* * * * *